(12) United States Patent
Bateman

(10) Patent No.: US 9,739,257 B2
(45) Date of Patent: Aug. 22, 2017

(54) WAVE ENERGY EXTRACTION DEVICE AND METHOD

(75) Inventor: William John Douglas Bateman, London (GB)

(73) Assignee: Zyba Renewables Limited, London (GB)

( * ) Notice: Subject to any disclaimer, the term of this patent is extended or adjusted under 35 U.S.C. 154(b) by 962 days.

(21) Appl. No.: 14/115,610

(22) PCT Filed: May 3, 2012

(86) PCT No.: PCT/GB2012/000408
§ 371 (c)(1),
(2), (4) Date: Feb. 10, 2014

(87) PCT Pub. No.: WO2012/150437
PCT Pub. Date: Nov. 8, 2012

(65) Prior Publication Data
US 2014/0196451 A1    Jul. 17, 2014

(30) Foreign Application Priority Data

May 4, 2011    (GB) .................................. 1107377.2

(51) Int. Cl.
*F03B 13/18*    (2006.01)
*F03B 17/06*    (2006.01)

(52) U.S. Cl.
CPC ............ *F03B 17/06* (2013.01); *F03B 13/182* (2013.01); *F03B 17/063* (2013.01); *Y02E 10/28* (2013.01); *Y02E 10/38* (2013.01)

(58) Field of Classification Search
CPC ...... F03B 17/06; F03B 17/063; F03B 13/182; F03B 13/148; F03B 13/18; B01D 61/10;

(Continued)

(56) References Cited

U.S. PATENT DOCUMENTS 1,887,316 A * 11/1932 Lockfaw ............... F03B 13/182
                                                                417/330
2004/0007881 A1* 1/2004 Kobashikawa ........ B01D 61/10
                                                                290/53

(Continued)

FOREIGN PATENT DOCUMENTS

WO    WO 2010/118437    10/2010

OTHER PUBLICATIONS

International Preliminary Report on Patentability, mailed Nov. 14, 2013, by the International Bureau of WIPO for corresponding application PCT/GB2012/000408 (8 pages).

*Primary Examiner* — Jason Shanske
*Assistant Examiner* — Kelsey Stanek
(74) *Attorney, Agent, or Firm* — Klarquist Sparkman, LLP

(57) ABSTRACT

A wave energy extraction device (or paddle) for converting wave energy into mechanical motion is curved in the horizontal plane, with a concave side (11) facing the incoming waves to increase energy capture and a convex side (12) on the lee side to reduce energy dissipation. The concave surface is substantially parabolic or semi-elliptical and the convex side is optionally provided with a substantially Gaussian profile (4) to improve the hydrodynamics and provide additional strength. To simplify connection to a base platform the paddle curvature optionally tapers to a straight edge (1) at the mounting points and the base device can be located either above or below the water surface. One embodiment is also curved about a vertical as well as the horizontal plane to create a spoon- or cup-shaped paddle (9).

14 Claims, 9 Drawing Sheets

(58) Field of Classification Search
CPC .......... F04B 17/00; Y02E 10/28; Y02E 10/38; F05B 2240/97
USPC .................. 416/6; 60/499, 495, 497; 290/53
See application file for complete search history.

(56) References Cited

U.S. PATENT DOCUMENTS

2007/0081861 A1* 4/2007 Goble ..................... E02B 9/08
  405/79
2009/0189395 A1* 7/2009 Ryynanen ............. F03B 13/183
  290/53

* cited by examiner

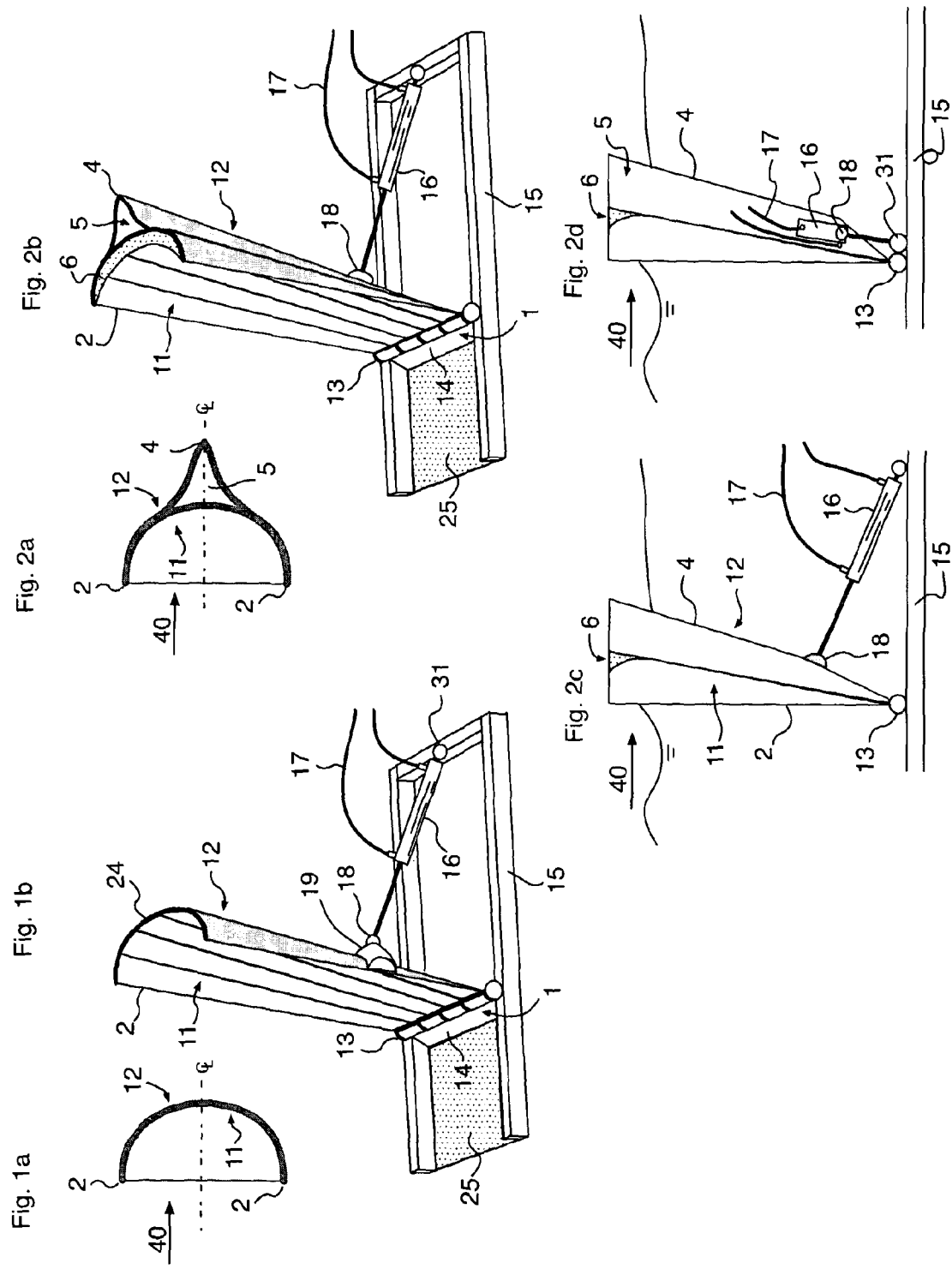

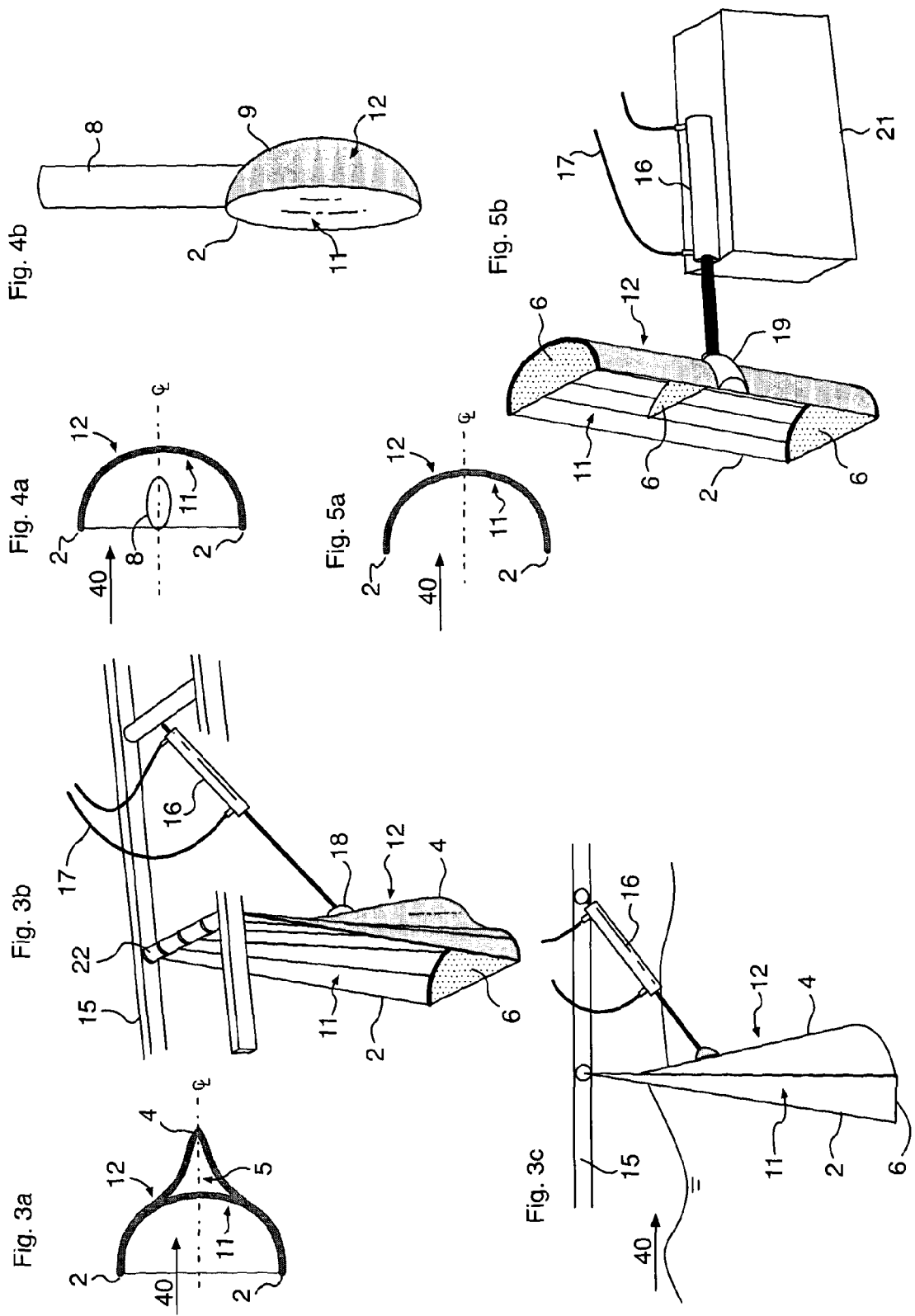

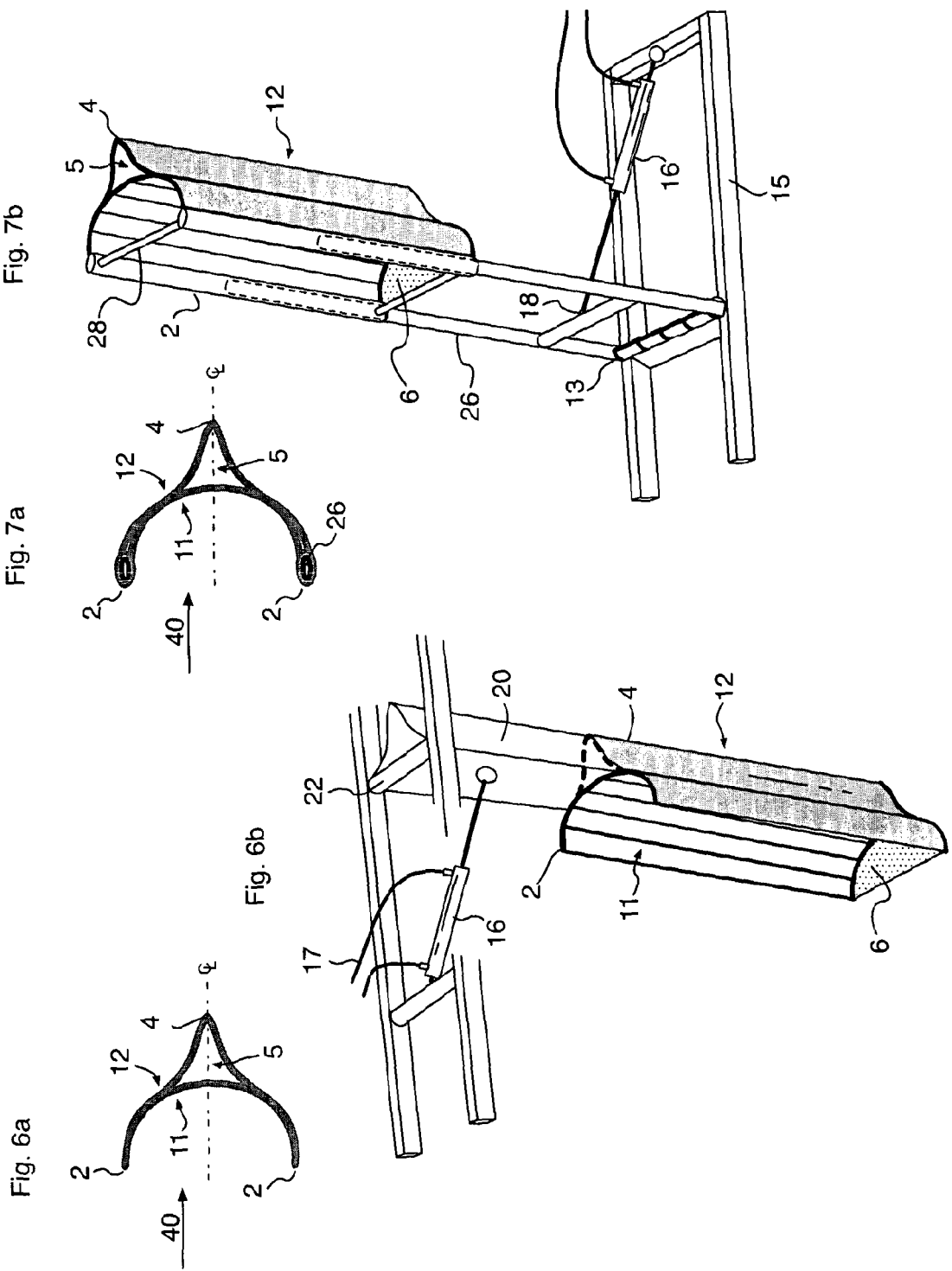

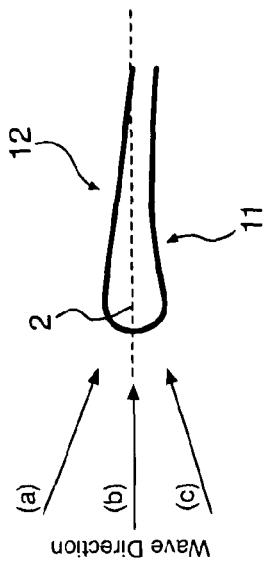
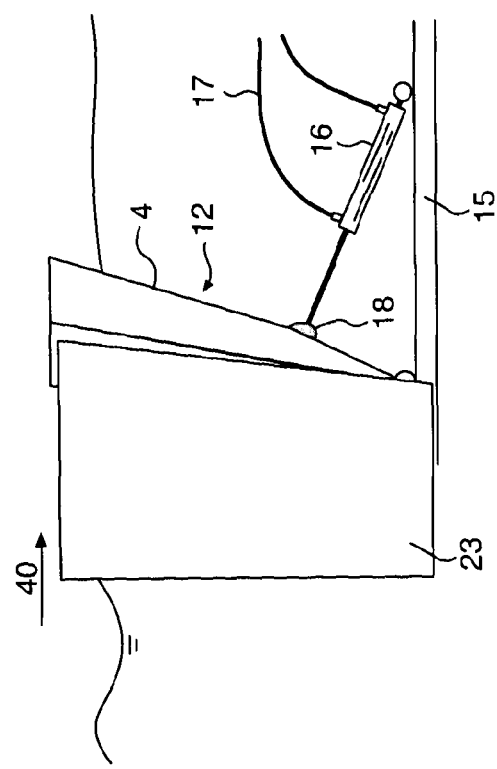
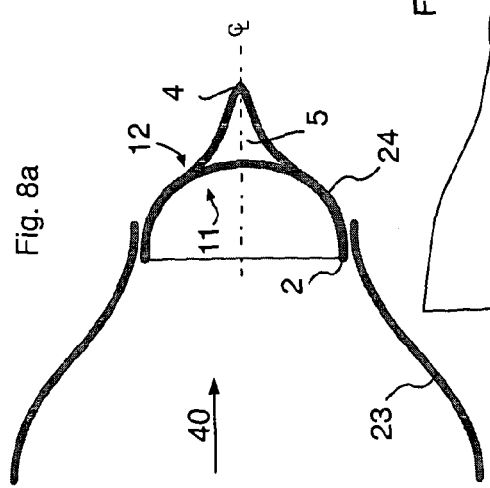
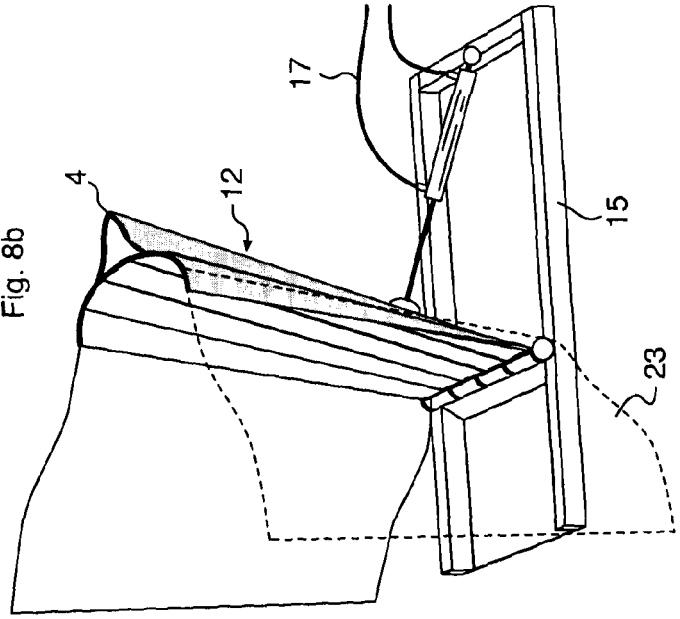

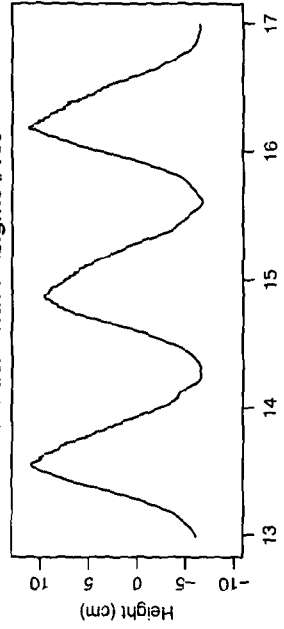
Fig. 18b
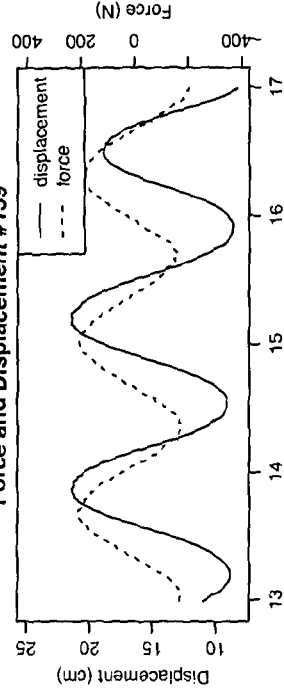
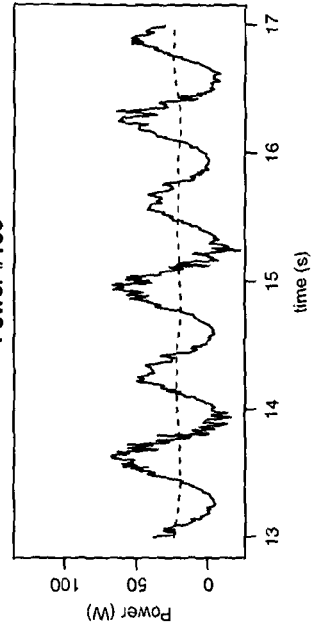
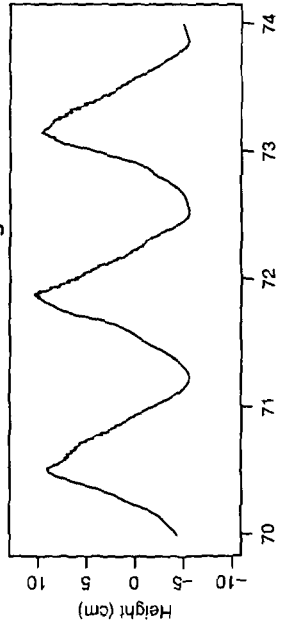
Fig. 18a
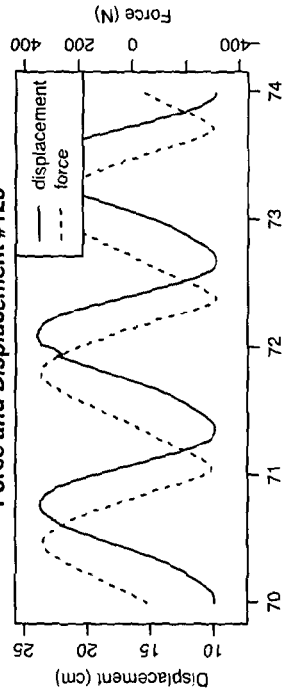
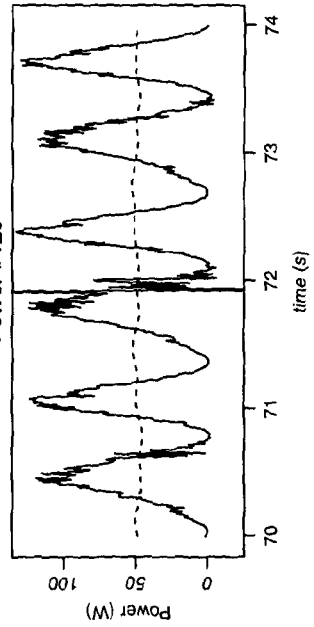

WAVE ENERGY EXTRACTION DEVICE AND METHOD

CROSS REFERENCE TO RELATED APPLICATIONS

This is the U.S. National Stage of International Application No. PCT/GB2012/000408, filed May 3, 2012, which was published in English under PCT Article 21(2), which in turn claims the benefit of Great Britain Patent Application No. 1107377.2, filed May 4, 2011, which is incorporated by reference herein in its entirety.

TECHNICAL FIELD

This invention relates to a wave energy extraction device or paddle for converting energy within water waves, particularly sea waves, into useful mechanical motion. The invention also extends to a wave energy conversion apparatus and to a method of extracting energy from water waves.

The world's oceans and other water bodies contain a vast amount of energy that has accumulated from passing weather systems and propagates as waves along the surface. This energy is frequently recognised as a 'green' power resource that could meet the world's energy needs many times over.

There are a variety of methods used to extract energy from the water waves. The main systems include:
1. Point absorbers that use the relative displacement between floating units at (or near) the surface and a fixed point to generate mechanical energy.
2. Attenuators that use a group of floating units that follow the surface and generate mechanical energy through their relative motion.
3. Wave paddles that cut vertically through the water waves and generate motion by interrupting the particle orbits to create a pressure gradient across the paddle that drives it forward and backward. Energy from this motion is captured by a hydraulic piston or ram to pump water, generate electricity, or generate or store energy in any other suitable manner.

BACKGROUND ART

Focussing on the third type of system mentioned above, different paddles designs have been proposed. For example, US-A-2008/0018113 and GB-A-2,333,130 describe downward hanging, flat, symmetric paddles that intersect the wave motion near the surface. These devices gradually absorb energy and flatten the waves as they pass beneath.

WO-A-2004/097212 and EP-A-2,292,924 are designed for shallow water with a symmetric paddle hinged about the bottom. WO-A-2004/097212 describes a substantially flat paddle with a slight vertical curvature. While the paddle in EP-A-2,292,924 is constructed from a sequence of horizontal tubular sections that give both faces a contoured vertical profile. The paddle additionally includes a pair of 'end effectors' that protrude evenly from each vertical side.

Though the constructions of the paddles within these devices all differ, they are mostly designed around the presumption that wave conditions driving a paddle in the direction of the energy movements ("forward") are equivalent, though applied to the opposite paddle face, to the forces that drive it against the energy movement ("backward"). Therefore each of these designs would operate equally well if installed in reverse. However, the flow of ocean energy typically has a strong directional bias: e.g. in the northern North Sea 95% of the incoming energy arrives within an arc of +/−30° of the mean direction.

Each of these paddles also have a substantially flat face on the lee side of the paddle. Therefore, when these paddles move they dissipate a significant amount of energy through the creation of secondary waves that propagate from the paddle. In an ideal system there would be no significant waves on the lee side of the paddle. One way to achieve this is to remove the water on the lee side of the paddle and create an air gap within which the paddle can move freely. However, this is both complicated and expensive to build and would require regular maintenance of the high-pressure waterproof seals.

What is needed is a straightforward paddle design that takes advantage of the directional bias in waves, in particular ocean waves, to increase the wave energy captured, while simultaneously reducing waves generated on the lee side to maximise its overall energy absorbing properties.

SUMMARY OF INVENTION

In accordance with the present invention, there is provided a wave energy extraction device for use with a wave energy conversion apparatus to extract and convert energy from water waves, the device having a height and a width and being arrangeable on the wave energy conversion apparatus so as to be at least partially submerged in the water and comprising of a first surface arranged to oppose a mean water wave direction, the first surface being concave about a vertical axis of symmetry of the device and a second surface disposed opposite the first surface and being convex about the vertical axis of symmetry of the device so as to be able to extract energy from the crest and the trough of the wave. In embodiments of the invention, there therefore exists an asymmetry between the first and second surfaces of the device (or paddle). This asymmetry both increases energy collection as the paddle moves in response to incident waves and reduces energy dissipation caused by the creation of new waves on the second (or lee) side of the device. The result is overall increased power extraction compared to a symmetrically shaped or flat device. The asymmetry further enables the device to take advantage of directional biases in water waves.

In an embodiment, the paddle device is arranged to be submerged in the water over a majority proportion of its height, for example to approximately 80% or over of its height. This maximises the energy collection for a given height of paddle. However, the paddle is preferably not entirely submerged and waves preferably should not be able to escape over the top of the paddle ("overtopping") since this would result in energy being lost. In some embodiments, the centre of the paddle may be higher than the edges, particularly when the paddle is wide, to prevent overtopping by the incident waves as they are focussed towards the centre, while minimising the use of material at the edges. Preferably, when viewed from a front elevation, the paddle is substantially rectangular in outline.

In an embodiment, the convex second surface has a cross-sectional profile that additionally extends to a generally pointed tip at the vertical axis of symmetry of the device. The cross-sectional profile of the second surface may be formed from any suitably smooth curve that comes to a relatively sharp point, such as a curve based on a Gaussian function. This provides the device with a hydro-dynamically efficient profile, improving laminar flow around the second surface, which reduces the dynamic drag pressure on the lee surface and reduces energy dissipation.

In an embodiment, the horizontal extremities of the concave first surface comprise tips arranged to substantially oppose the mean wave direction during use. The tips may comprise generally aerofoil shaped tips, the aerofoil shaped tips having a leading edge arranged to oppose the mean wave direction during use. The tips result in a clean separation of the flow into the concave face of the paddle and around it.

In one embodiment, the first surface extends continuously across the wave energy extraction device between horizontal extremities thereof. In this way, the entire width of the first surface is movable in response to incident waves to generate power.

Alternatively, the device comprises two or more components including: a wave energy absorber component having a first width and adapted to move in response to incoming water waves for extracting power; and a wave energy concentrator component for concentrating water waves from across a second width greater than the first width down to the first width and guiding the concentrated wave energy towards the wave energy absorber component. In this embodiment, the amount of wave energy that can be captured by the paddle for each wave crest is increased by channelling the wave on either side of the paddle towards the paddle surface using a wave concentrator that is preferably stationary relative to the incoming waves. The channelled portion of the wave would otherwise have moved past the paddle and some of the potential energy lost. Advantageously, this means that a relatively small paddle, having consequently smaller drag and simplified construction, is able to capture the same energy as a much larger moving paddle.

In an embodiment, the device includes an attachment point for attachment to the wave energy conversion apparatus. The attachment point may comprise a hinge point for hinged attachment to the wave energy conversion device. The attachment point may be located at one of the upper and lower end of the device so as to pivotally hinge the device to the wave energy conversion apparatus. The device is then able to hang vertically from the wave energy conversion apparatus if the attachment point is at the upper end, or stand generally upright in the water if the attachment point is at the lower end.

The device may have a cross-sectional profile that varies over the device height. The cross-sectional profile may taper towards a flat profile adjacent the attachment point for ease of attaching the device to the wave energy conversion apparatus. Additionally, having a generally flat profile in an attachment point adjacent the sea bed is easier to seal to restrict flow of water beneath the paddle and preventing energy from being lost. In another arrangement, where the paddle is adapted for rotational motion about an attachment point, the curvature of the paddle body changes at least partly along the height of the paddle, the body being more curved at a first point thereon which is a further distance away from an axis of rotation of the paddle than at a second point thereon.

In one embodiment, the attachment point is operable to adjust the relative spacing between the wave energy extraction device and the wave energy conversion apparatus. A flexible joint that permits the device to move up and down in response to changes in sea level (due to tides, for example) leads to improved extraction of wave energy by optimising the position of the device relative to sea level. A flexible joint would also assist in moving the paddle relative to the energy conversion apparatus for ease of maintenance and installation.

The device may include one or more generally horizontally disposed shelves for limiting fluid flow vertically along the first surface of the device. These shelves increase power absorption, particularly when they are located at or near the top and/or bottom of the device to prevent water overtopping or flowing underneath it, respectively, and provide additional structural strength. The depth of each shelf may vary from approximately $1/10$ of the device depth to full depth of the device. The shelf may be flat, but is preferably contoured in profile when attached to either the top or bottom of the device to provide a smooth transition towards the second surface. This decreases drag. Additionally, the concave first surface of the device is preferably also curved to connect smoothly with the shelf. A smooth profile reduces stress concentrations as waves impact the surface of the device.

In a preferred embodiment, a first internal volume is formed between the convex second surface and the generally pointed tip. The generally pointed tip may be formed by a third surface that is separate to and fixedly arranged on the second convex surface to provide the first internal volume. The pointed tip advantageously reinforces the strength and rigidity of a central portion of the wave energy device where the wave energy is concentrated by the concave first surface. The first and second surfaces may also be separate components fixed together around their peripheries to form a second internal volume between them.

The internal volumes may be air voids configured to provide buoyancy or storage space inside the device. In this design, some form of access to the internal void is included and the void may be provided with one or more hooks, clips or other equipment attachment means for housing cables and any other equipment. The internal volumes may also contain power conversion apparatus or desalination equipment such as osmotic membranes and filters.

Each of the first concave surface and the second convex surface may be substantially parabolic or semi-elliptic in form and the form of the first concave surface and form of the second convex surface may be different to each other. In some embodiments, the parabolic or semi-elliptic form is approximated using a plurality of straight sections for the ease of manufacture and/or attachment to the wave power conversion apparatus.

In some embodiments, either or both of the first surface and the second surface are concave also about a horizontal axis to form a cup-shaped paddle.

The concavity of the first surface preferably has a depth that is between $1/16$ and $1/4$ of length of an expected dominant wavelength of the water waves.

The device may include one or more hydraulic rams arranged on the second surface for operable connection to the wave energy conversion apparatus. The wave energy conversion apparatus may comprise a base platform operably attached to the bed of a body of water in use of the apparatus. In an embodiment the base platform is anchored to the bed of the body of water. Alternatively, the base platform may be fixedly disposed on a pontoon that is anchored to the bed of the body of water. Preferably the base platform can rotate about a vertical axis, to redirect the device depending upon changing incident wave direction and energy, thereby providing control to the amount of energy extracted by the device. For example, energy extraction could be maximised by turning the device directly towards incident waves or the device can be turned at 90° to the incident waves during repair or maintenance of the device.

The paddle device may be operably connected to the wave energy conversion apparatus by a power conversion means for converting movement of the device to useful forms of power, usually electrical power. However, the apparatus could also be used for example to pump pressurised water or to generate hydrogen. In an embodiment, the power conversion means comprises a hydraulic accumulator operably coupled to the hydraulic ram for pumping of a working fluid to a hydraulic accumulator, a hydraulic motor arranged to be driven by the hydraulic accumulator and an alternator arranged to be driven by the hydraulic motor.

In one embodiment the wave energy conversion apparatus further comprises a wave condition sensor and a controller in operable communication with the wave condition sensor and the hydraulic ram, the sensor to relay a sensed condition of incident waves to the controller, the controller to control movement of the hydraulic ram according to the sensed wave condition. In this manner, the apparatus can be operated efficiently according to the strength of the sensed wave conditions and in extreme circumstances the paddle can be withdrawn away from the water surface and the most active part of the waves to prevent damage to the apparatus.

Another aspect of the invention provides a method of extracting useful energy from water waves comprising: at least partially submerging a wave energy conversion apparatus in a body of water; angling a first surface of the wave energy conversion apparatus to oppose an approximate mean water wave direction, the first surface being concave about a vertical axis; and extracting energy from movement of the wave energy conversion apparatus caused by both the crest and the trough of incoming waves. Advantageously, the concave surface facing into the wave direction guides and channels wave energy towards the centre of the apparatus, such that this method extracts more useful energy from each crest and trough of incoming waves.

Preferably, the wave energy conversion apparatus is provided with a second surface angled to be on the lee side of the apparatus pointing in the approximate mean water wave direction and shaped to minimize water resistance in order to decrease the amount of useful energy lost to drag.

In another aspect, there is provided a device for absorbing water wave energy comprising a paddle having a backward-facing surface on a first side of the paddle and a forward-facing surface on a second side of the paddle opposite the first side, the backward-facing surface having a high resistance to water motion and the forward-facing surface having a low resistance to water motion, the paddle adapted to be submerged in water such that the backward-facing surface is angled predominantly towards incoming waves and is moved backwards and forwards by incoming waves to absorb their energy with the majority of the paddle remaining underwater over the range of motion of the paddle. In a similar manner to other aspects, the high resistance backward-facing surface increases the amount of energy that is absorbed from each incoming wave while the low resistance forward-facing surface decreases the energy lost as the paddle moves through the water.

In one embodiment, the paddle is hinged about either of an upper or a lower end of the paddle and adapted to rotate backwards and forwards about the hinge in response to the movement of incoming waves. The hinge is a simple but effective manner of ensuring that the paddle moves smoothly backwards and forwards with incoming waves crests and troughs, absorbing the maximum amount of energy.

Another aspect of the invention provides a water wave energy absorbing paddle having a first surface, the first surface having a curvature which varies over a height of the paddle from a flat portion at a first end of the paddle to a concave portion at an opposite end of the paddle, the flat portion for connection to a hinge permitting rotation of the paddle, the concave portion for focusing incoming waves causing rotation of the paddle about the hinge to absorb the energy of the incoming waves. This aspect of the invention provides a balance between having a curved paddle, which increases the energy absorbed from incoming waves, and a flat paddle, which is easier to connect to a hinge to constrain the paddle to rotating backwards and forwards with the waves.

In one embodiment, the paddle has a second surface, opposite the first surface, the second surface having a curvature which varies over the height of the paddle from a flat portion at the first end of the paddle to a convex portion at the opposite end of the paddle, the convex portion to reduce the resistance of the second surface to motion through water and preferably having a Gaussian profile. Similar to other embodiments, the Gaussian profile minimises the energy lost to drag as the paddle moves through the water.

In another aspect there is provided a method of extracting energy from water waves comprising: at least partially submerging a water wave paddle in a body of water, channelling incoming waves from each side of the paddle towards the paddle, thereby focusing the energy of the waves onto a front surface of the paddle, and converting movement of the paddle caused by the incoming waves into usable energy. This aspect of the invention increases the amount of wave energy that can be captured by the paddle for each wave crest by channelling the wave on either side of the paddle towards the paddle surface. The channelled portion of the wave would otherwise have moved past the paddle, losing energy. Advantageously, this means that a relatively small paddle, having consequently smaller drag and simplified construction, is able to capture the same energy as a much larger one.

Another aspect of the invention provides a water wave energy extraction system, comprising: a wave energy absorber having a first width and being at least partially submerged in water and adapted to move in response to incoming water waves, the movement of the wave energy absorber being convertible into useful energy; and a wave energy concentrator for concentrating water waves from across a second width greater than the first width down to the first width and guiding the concentrated waves towards the wave energy absorber. Similar to the previous aspect, by concentrating wave energy from a width greater than the width of the wave energy absorber itself the energy absorbed from each wave crest is increased without increasing the size of the wave energy absorber itself.

BRIEF DESCRIPTION OF DRAWINGS

Further features and advantages of the present invention will now be described with reference to the accompanying drawings in which:

FIG. 1a is a schematic plan view of a first wave paddle embodying the present invention;

FIG. 1b is a 3D side elevation view of the wave paddle of FIG. 1a connected to a base device;

FIG. 2a is a schematic plan view of a second wave paddle embodying the present invention;

FIG. 2b is a 3D side elevation view of the wave paddle of FIG. 2a connected to a base device;

FIG. 2c is a side view of the system of FIG. 2b;

FIG. 2d is a side view of an alternative arrangement of the system of FIG. 2b, demonstrating an internally provided energy conversion apparatus;

FIG. 3a shows a schematic plan view of a third wave paddle embodying the present invention;

FIG. 3b is a 3D side elevation view of the wave paddle of FIG. 3a connected to a base device;

FIG. 3c is a side view of the system of FIG. 3b;

FIG. 4a is a schematic plan view of a fourth wave paddle embodying the present invention;

FIG. 4b is a 3D side elevation view of the wave paddle of FIG. 4a;

FIG. 5a is a schematic plan view of a fifth wave paddle embodying the present invention;

FIG. 5b is a 3D side elevation view of the wave paddle of FIG. 5a connected to a base device;

FIG. 6a is a schematic plan view of a sixth wave paddle embodying the present invention;

FIG. 6b is a 3D side elevation view of the wave paddle of FIG. 6a connected to a base device;

FIG. 7a is a schematic plan view of a seventh wave paddle embodying the present invention;

FIG. 7b is a 3D side elevation view of the wave paddle of FIG. 7a connected to a base device;

FIG. 8a shows a schematic plan view of a wave paddle and wave concentrator embodying the present invention;

FIG. 8b is a 3D side elevation view of the system of FIG. 8a with the wave paddle connected to a base device;

FIG. 8c is a side view of the system of FIG. 8b;

FIG. 9 is a schematic plan view of the leading edge of the tip of a wave paddle embodying the present invention;

FIGS. 18a and 18b present experimental results for an asymmetric curved paddle and symmetric flat paddle, respectively.

DESCRIPTION OF EMBODIMENTS

Figure 11:
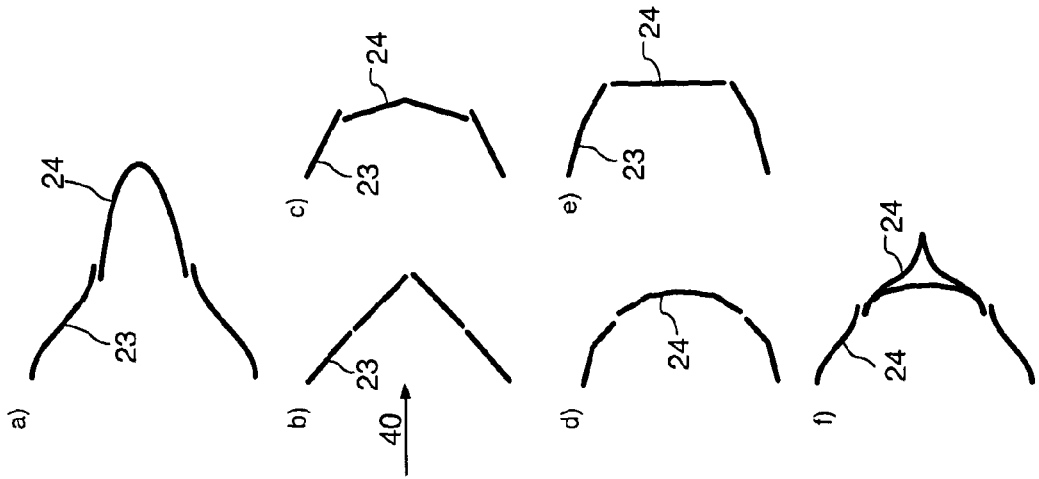
FIGS. 11a to 11f are schematic plan views illustrating a range of possible cross-sections for wave paddles and wave concentrators embodying the present invention.

Embodiments of the present invention relate firstly to the design and shape of paddles 24 to extract energy from water waves, particularly ocean/sea waves but also waves in bays/harbours, lakes, lochs, estuaries, reservoirs or other suitable natural or man-made bodies of water. The paddles take advantage of directional biases in wave motion by being asymmetric in a plane perpendicular to the mean direction of wave energy travel. This asymmetry increases energy collection and reduces energy dissipation compared to known, substantially flat, paddle designs. Paddles embodying the invention deliver a smooth power stroke that reduces fatigue from sudden impact loads.

The described paddles 24 are intended for use with a wave-power conversion system or "base device" 15 which together extracts energy from the movement of the paddle and converts it into a useful form, usually electricity. It may also be used directly to desalinate sea-water, for example.

FIGS. 1a and 1b are schematic plan and 3D side elevation views, respectively, of a first wave paddle embodying the present invention. The paddle has a concave surface 11 that points towards the incoming waves 40 (the "backward face") and an opposing convex surface 12 that points in the direction of the wave travel (the "forward face"). The curvature of the paddle reduces along its height, tapering to a flat edge 1 at the bottom of the paddle for easy connection to a base device 15 below the surface of the water, with the top curved edge of the paddle emerging above the surface of the water. At its maximum curvature, the shape of the paddle is preferably a parabola or semi-ellipse in a horizontal plane with the side edges or tips 2 of the paddle pointing substantially into the incoming wave direction.

In use, the paddle is connected to a base device 15 via a hinge 13 allowing the paddle to rotate or rock backwards and forwards in response to incident wave crests and troughs. The base device 15 comprises one or more energy converting means such as hydraulic rams 16 (only one shown) to convert motion of the paddle into useful energy. The ram 16 has a flexible coupling 18 that connects to a support 19 on the convex forward face 12 of the paddle. The support 19 preferably extends the whole width of the paddle and is preferably located at one third of the paddle's height from the bottom. This configuration gives the paddle vertical flexibility, reducing the chance of fracture, particularly near the surface when sudden impact loads are most common due to breaking waves or impacts with other floating bodies.

The concave backward face 11 preferably has a drag coefficient ($C_d$) greater than 2.0. As fluid enters the concave face 11 between the paddle tips 2 its inability to go either sideways or down leads to high stagnation pressures on the paddle face and an increase in the water surface elevation ("run-up"). The concave face 11 also channels the incoming wave crests towards the centre of the paddle, which further magnifies the crest elevation and the dynamic pressures against the paddle.

Additionally, the concave surface of the backward face 11 ensures a smooth transition of power from the wave to the paddle, with the wave crests meeting first the tips 2 and then gradually coming into contact with more and more of the backward face 11 of the paddle.

During the formation of a wave trough, when the wave fluid particles move backward away from the paddle's concave backward face 11, the concave shape now acts to magnify the depth of the trough creating a lower water surface than would otherwise occur without the paddle. Consequently, the magnitude of the dynamic pressure ($D_1$) is again increased during this phase of the wave motion, though now of opposite sign.

In general, regardless of paddle shape, the volume of fluid displaced as a paddle moves is directly related to its swept area. The convex forward face 12 of the paddle embodying the present invention displaces water over a larger circumference than a flat paddle with a consequent reduction in the fluid velocities normal to the paddle surface, leading to smaller waves that reduce the dynamic pressures ($D_2$) on the forward face, and a substantial reduction in energy dissipation.

A further advantage of the convex forward surface 12 arises from the fact that the incident waves move faster than the paddle. As the waves overtake the paddle on the outer side of the tips 2, the curved forward surface 12 improves laminar flow around the paddle. This mobilises the water ahead of the paddle so that its motion is more closely aligned with the motion of the paddle. This greatly reduces the dynamic pressure ($D_2$) against the forward face 12, which increases the pressure differential between the forward 12 and backward 11 faces leading to increased power absorption. Furthermore, the overtaking waves merge smoothly together on the front side of the paddle creating less turbulence (or eddies) that would otherwise cause energy losses.

One drawback of the convex forward face 12 is that skin friction and drag due to flow parallel to the surface is increased, though this can be expected to be relatively small for the velocities concerned. Nevertheless the forward face 12 is provided with a smooth finish to minimise drag.

To maximize energy capture, the top edge of the paddle should be slightly higher than the maximum expected height of wave crests (the "freeboard") taking into account changes in the water height, changes in angle of the paddle over its range of motion, and the run-up due to the concave backward face 11. In deep water, the paddle preferably extends to a depth approximately half the dominant wavelength to capture the majority of the wave's energy, and the base device includes a horizontal shelf 25 to restrict downward flow. In shallow water, the paddle extends the full water depth and the base device 15 includes a seal 14 against the seabed preventing water flowing beneath the paddle. Consequently, the height of the paddle depends upon the water depth, wave conditions and the position of the base device.

As an example in shallow water of 10 m depth and assuming that the base device stands 1 m from the seabed, that the significant wave height is Hs=1.9 m, and that the peak period, $T_p$=5.9 s, then the paddle should be approximately 11.5 m high. This allows the paddle to tilt through a range of +/−22° and retain at least 1 m freeboard when the paddle is tilted most and sitting lower in the water. Without this freeboard the waves can wash over the paddle reducing the energy it can extract. The freeboard should not be larger than necessary since this would increase the weight of the paddle and, in extreme seas, a limited freeboard allows excess energy to escape and constrains the loads on the paddle. In very extreme seas the paddles should be withdrawn from the water surface, either by lifting it out of the water or lowering it against the seabed. In some environments it may be preferable for the paddle to operate less efficiently by remaining fully submerged, in particular where there is: excess wave energy for the power requirements; surface traffic (e.g. shipping lanes or local leisure craft); or environmental concerns (e.g. visual impact).

Preferably the base unit 15 can be raised or lowered in response to changes in water depth caused by the tide and storm surge so that substantially the same area of the paddle is exposed to the incident waves.

The width of the paddle, being the dimension parallel to wave fronts when the paddle is in use, is determined by factors including the power required and the average expected wavelength of incident waves at the point of deployment: as the width of the paddle increases relative to the average incident wavelength, the relative motion between the paddle and the surrounding fluid starts to approximate a flat surface removing many of the advantages associated with the present invention. Other limitations to the paddle width include its weight and the strength of the materials from which it is constructed.

In deep water the paddle can be wider than it is high to maximize power absorption. However, in shallow water, where the base device can be mounted directly on the sea bed, the paddle will typically be higher than it is wide so that it extends the full depth of water. However the relative proportions of height to width, will depend, for example, on anticipated wave conditions and power requirements.

It is also not essential that the height of the paddle be constant across its width. As the curved backward face 11 focuses waves towards the centre of the paddle, the wave height will increase. To reduce the chance of overtopping at the centre, the centre of the paddle may therefore be higher than the edges.

The depth of the concavity in the backward face 11 will typically be within a range equal to the width of the paddle to about a quarter of the width of the paddle to ensure that a suitable curvature can be obtained. The preferred depth of the concavity at the water surface relates to the expected wave conditions and should ideally lie between $\frac{1}{16}$ and $\frac{1}{2}$ of the dominant wavelength. A greater depth of the concavity in the backward face 11 captures more of the incoming wave energy, by limiting the egress of excess water in a wave crest/trough around the paddle tips 2, such that a depth of less than $\frac{1}{16}$ of the wavelength would capture an insignificant proportion of incident wave energy. If other constraints (such as weight or variable seas) require the depth to be less than about $\frac{1}{16}$ of the incident wavelength, the tips 2 can be extended in the forward direction, parallel to the direction of wave travel, to limit the effects of egress. On the other hand, a depth greater than about $\frac{1}{2}$ of a wavelength would bridge sequential wave crests and troughs, leading to conflicting flow directions at different points over the paddle surface.

The tips 2 on the edges of the paddle, facing the incoming waves, are positioned to be substantially parallel to wave particle motions, i.e. substantially perpendicular to the wave crests. As illustrated in FIG. 8, each tip is provided with a blunt shape with a cross-section similar to an aerofoil but with neutral lift. This ensures a clean separation of the flow into and around the paddle. The precise angle and width of the tips will depend on the expected variance in the dominant wave direction. In general, the width of the tip should be largest near the water surface. Also a wider tip should be used when there is greater variance in the dominant wave direction in order to reduce vortices, maintain laminar flow, and limit structural vibrations and fatigue. Where there is significant variance in wave direction, typically of more than +/−30°, the entire paddle should be rotatable toward the incoming waves to maximize power extraction.

The paddle may be constructed in a number of different ways. One simple method of construction is to roll a flat sheet of suitable metal (e.g. aluminium) into the require curvature, or the paddle can be moulded from a suitable plastic or composite material (e.g. glass reinforced plastic). Another way of constructing the paddle is to form it from a plurality of hollow tubes welded or otherwise fixed together in the desired shape. Each hollow tube would have an internal volume, which would improve buoyancy of the paddle if sealed and can also be used for storage of equipment (see discussion below in connection with FIGS. 2 and 13b).

FIGS. 2a, 2b and 2c are a schematic plan, 3D and side elevation views, respectively, of a second wave paddle embodying the present invention. This second embodiment is identical to the first embodiment except for the addition of a forward-facing tip 4 and a shelf 6 on the backward face 11.

Specifically, the convex forward face 12 is provided with a relatively sharp tip 4 which points in the direction of wave travel and tapers towards the flat edge 1 at the bottom of the paddle. The forward-pointing tip 4 further improves laminar flow around the paddle, which further enhances the water mobilisation effect described in connection with FIG. 1 above.

Preferably, the shape of the forward pointing tip 4 is similar to the drag zone (represented as a body of water 41 in FIG. 17a) that would otherwise be created. For example, a suitable shape is a Gaussian function with a variance of between 0.2 and 1 and scaled to merge smoothly with the convex forward surface 12 of the paddle. Other shapes having a hydrodynamic profile (generally, a sharp forward edge and a wide base) may be used instead of a Gaussian function. The horizontal distance from the front of the forward-pointing tip 4 to the centre of the backward concave face 11 is typically around ½ of width of the paddle to create a suitably smooth overall profile.

Starting from a paddle similar to that shown in FIG. 1, formed from a curved sheet of metal for example, the forward-pointing tip 4 may be formed as a separate sheet and then attached to the main body of the paddle 24 creating internal volume 5. The additional material defining the internal volume 5 increases the paddle second moment of area, in each of the principal horizontal dimensions, giving the centre of the paddle additional structural strength and rigidity.

Another option is to form or mould the paddle, including the forward pointing tip 4 as a single piece, with or without an internal volume 5. Alternatively, a plurality of tubular members can be fixed together.

The internal volume 5 is preferably sealed and watertight, but may also be open to water. The internal volume 5 can house additional structural members to provide even more structural strength and, if sealed, provides buoyancy that gives the paddle a generally vertical bias within the water. The internal volume 5 may also house energy conversion or water desalination equipment. If the internal volume 5 is sealed this will protect equipment stored inside it from the corrosive effects of sea-water.

Also in this second embodiment, a horizontally disposed shelf 6 is optionally located at the top of the backward face 11 of the device. The shelf 6 can be formed by curving a top portion of the backward face 11 or by fixing a shelf portion to the backward face 11. In either arrangement, the shelf should transition or merge smoothly with the backward face 11, as best illustrated in FIGS. 2c and 2d to reduce structural stress concentrations. The shelf helps to prevent water flowing over the top of the backward face 11 in use ("overtopping"), thereby increasing power absorption, and provides additional structural strength.

The depth of the shelf 6 maybe equal to the depth of the concavity in the backward face 11, particularly if rough seas are expected with a significant chance of overtopping or if the top of the device is to be located at or below the surface of the water. Alternatively, the shelf 6 may extend only 1/10 of the depth of the concavity, for example, in calmer water or where there is a large freeboard. Conversely, where there is a substantial risk of extreme waves (also called freak waves) it may be desirable to permit overtopping by selecting the dimensions of the shelf 6 to provide sufficient additional strength without completely constraining the water within the concavity.

Although not shown in the figures, the forward face 12 and forward-pointing tip 4 preferably also merge with the curvature of the shelf 6 to provide a smooth transition towards the second surface, reducing drag.

In use, bending moments on the paddle are largest where the support 19 connects to the paddle and this part of the paddle is preferably the strongest. To increase structural strength, tapering of the curvature of the paddle is preferably gradual from the top of the paddle to the connection point, with a more rapid taper down to the straight edge 1 below the connection point, as illustrated in FIG. 2c.

FIG. 2d is a side elevation view of an alternative arrangement of this second embodiment. In this arrangement, at least part of an energy conversion apparatus (only the hydraulic ram 16 and flexible hydraulic pipes 17 are shown) is mounted within the internal volume 5. In this configuration the connection 31 between the hydraulic ram 16 and the base device 15, is located close to the hinge 13. This arrangement advantageously protects the equipment from the harsh external salt-water environment, reducing the need for protective casings and/or coatings, thereby reducing costs. Furthermore, the integrated design permits installation or removal of the power conversion apparatus together with the paddle 24. One disadvantage is that a flexible high-pressure seal is required at the point where the piston from the hydraulic ram 16 exits the internal volume 5.

FIGS. 3a, 3b and 3c show schematic plan, 3D and side elevation views, respectively, of a third wave paddle embodying the present invention. This third embodiment is identical to the second embodiment but has been adapted to be top-mounted to a base device 15 from which the paddle hangs vertically downwards. The curved backward 11 and forward 12 faces, and the forward-pointing tip 4, taper to a flat top edge 22 for easy connection to the base device 15.

With a top-mounted paddle, the magnitude of the paddle's linear horizontal speed as it rotates around the top edge 22 increases with depth. However, particle motions within incoming waves reduce with depth. Preferably, therefore, the paddle should not extend below the point where the speed of the bottom tip of the paddle exceeds the particle velocities within the incoming waves at that depth.

A shelf 6 is preferably connected across the bottom of the concave backward face 11 blocking fluid flow down this face. The shelf 6 is preferably curved upward towards the forward-pointing tip 4 to further reduce drag resistance as the paddle moves forward through the water.

FIGS. 4a and 4b are schematic plan and 3D side elevation views, respectively, of a fourth wave paddle embodying the present invention. This fourth embodiment retains the concave backward surface 11 and convex forward surface 12 of other embodiments but is curved both horizontally and vertically to create a cupped or spoon shape 9. This shape may be formed as a hollow ellipsoid or as a surface of revolution created by rotating a parabola or other suitable shape about its central axis of symmetry. The paddle is connected by a connecting rod 8 to a base device, which is preferably either directly above or below the paddle, but may be at any other orientation. The connecting rod 8 preferably has an elliptical cross-section with the sharper ends of the ellipse pointing in the mean wave direction to minimise drag.

FIGS. 5a and 5b are schematic plan and 3D side elevation views, respectively, of a fifth wave paddle embodying the present invention. This fifth embodiment is identical to the first embodiment except that the curved backward 11 and forward surfaces 12 of the paddle do not taper to a flat edge, but instead have a constant curvature along the height of the paddle. Such a paddle is easier to construct, is suited for use with a base device 21 that relies on a lateral rather than rotational movement of the paddle, and is preferable for use in shallow water waves where the flow velocities of waves decays slowly with depth.

As illustrated in FIG. 5b, for connection to a base device 21 relying on lateral movement, a support 19 is connected to the centre of the convex forward face 12 of the paddle for connection to a ram 16 of the base device 21. A plate or shelf 6 is preferably connected across the bottom of the concave backward face 11 blocking fluid flow down this face and under the device. The shelf 6 is preferably curved upward towards the forward face 12 to create a smooth join with the forward face 12 to reduce drag resistance as the paddle moves forward through the water. The shelf 6 preferably extends backwards for the full depth of the concavity in the backward face 11 to minimise the egress of water.

If the device is intended to be fully submerged or with a small freeboard then preferably a further shelf 6 is connected across the top of the concave backward face 11, blocking flow up this face and over the device. Again, the shelf 6 is preferably curved to a smooth transition with the forward face 12 to reduce drag resistance. Also, the shelf 6 preferably extends backwards for the full depth of the concavity in the backward face 11 to minimise the egress of water, but may be less than the full depth if significant overtopping is not anticipated or if there is a need to limit the maximum energy extracted from particularly large waves.

Further horizontal shelves 6 of any suitable depth may also be provided along the height of the backward face 11 to provide additional structural strength.

FIGS. 6a and 6b are schematic plan and 3D side elevation views, respectively, of a sixth wave paddle embodying the present invention. This sixth embodiment is identical to the second embodiment except that the curved surfaces 11,12 of the paddle and the forward pointing tip 4 do not taper to a flat edge 1 and instead have a constant curvature along the height of the paddle. As with the fifth embodiment, such a paddle is easier to construct. The paddle may be used with a base device relying on lateral motion, similar to the fifth embodiment described above. Alternatively, as illustrated in FIG. 6b, the paddle can be adapted to pivot relative to the base device 15 by providing a structural member 20 supported within the internal volume 5 and extending from the paddle to make a pivoting connection 22 with the base device 15. The ram 16 of the base device 15, for converting motion of the paddle into usable energy, may be connected to the structural member to avoid placing stress on the paddle itself.

As illustrated in FIG. 6b, the paddle may be located below the base device, but can also be positioned above the base device, or at any other orientation. Preferably, a shelf 6 is connected across the bottom of the concave backward face 11, as with the fifth embodiment above.

In one variation, the structural member 20 is moveably or flexibly connected to the paddle 24. This allows the vertical position of the paddle to be adjusted relative to the base device 15 to keep its position constant relative to the water level. Since sea level, for example, changes with tides, changing the position of the paddle ensures optimal power output with changing water depths. This vertical adjustment is preferably achieved using the buoyancy that results from the internal volume 5 of the device, which allows it to adjust automatically.

FIGS. 7a and 7b are schematic plan and 3D side elevation views, respectively, of a seventh wave paddle embodying the present invention. This seventh embodiment is identical to the sixth embodiment except that the paddle tips 2 are enlarged to incorporate structural members 26 for connection to the base device 15. A moveable or flexible connection exists between the structural members 26 and the paddle tips 2, which allows the vertical position of the paddle to be adjusted relative to base device 15 similar to the sixth embodiment above. Also shown is a rod or bar 28 that connects the paddle tips 2 to improve the structural rigidity of the device and prevent excessive lateral deformation of the device.

As with the third embodiment, preferably a shelf 6 is connected across the bottom of the concave backward face 11 blocking fluid flow down this face. The shelf 6 is preferably curved upward towards the forward-pointing tip 4 to further reduce drag resistance.

FIGS. 8a, 8b and 8c show schematic plan, 3D and side elevation views, respectively, of an eighth wave paddle 24 embodying the present invention. The paddle design shown in these Figures is identical to that of FIG. 2, but may instead be of any suitable design, including a totally flat design. Placed either side of the paddle on the backward-face side are two wave deflector or wave concentrator panels 23. In one embodiment, the panels do not move in response to incoming waves but instead channel incident wave energy towards the movable paddle 24, magnifying both the height of the crests and the depth of the troughs received by the movable paddle. These panels 23 are useful where the maximum width of the paddle 24 has been reached due to size, weight or other limits, but where the system is capable of extracting more useful energy from each wave.

In another embodiment, the panels 23 are also movable in response to incoming waves and each panel 23 and the paddle 24 is provided with an energy extraction device such as a hydraulic ram. The panels 23 and paddle 24 may all be mounted on a single base device or may be mounted on separate base devices for flexibility in the relative position of the panels 23 and paddle 24 depending upon wave conditions. Having several independently movable components means that the different surfaces can react out of phase with each other to, in particular, receive directional wave energy. The independent multipart design also increases flexibility in manufacture and deployment, through the use of smaller, individual but combinable components.

Preferably, similar to the paddle embodiments described above, the tips on the edges of the panels 23 facing the incoming waves have a blunt, aerofoil-like shape as illustrated in FIG. 9.

The embodiments described above have either constant curvature along the height of the paddle or the curvature tapers gradually to a straight edge along the height of the paddle. However, the present invention is not limited to these particular arrangements. Other embodiments of the invention may have a constant curvature along parts of the height of the paddle and portions where the curvature changes along the height of the paddle. Changes in curvature are also not limited to transitions from a curve to a straight edge. Different parts of the paddle may have different general curvatures depending upon anticipated wave conditions and the base device design with smooth transitions between curvatures along the height of the paddle.

Figure 10:
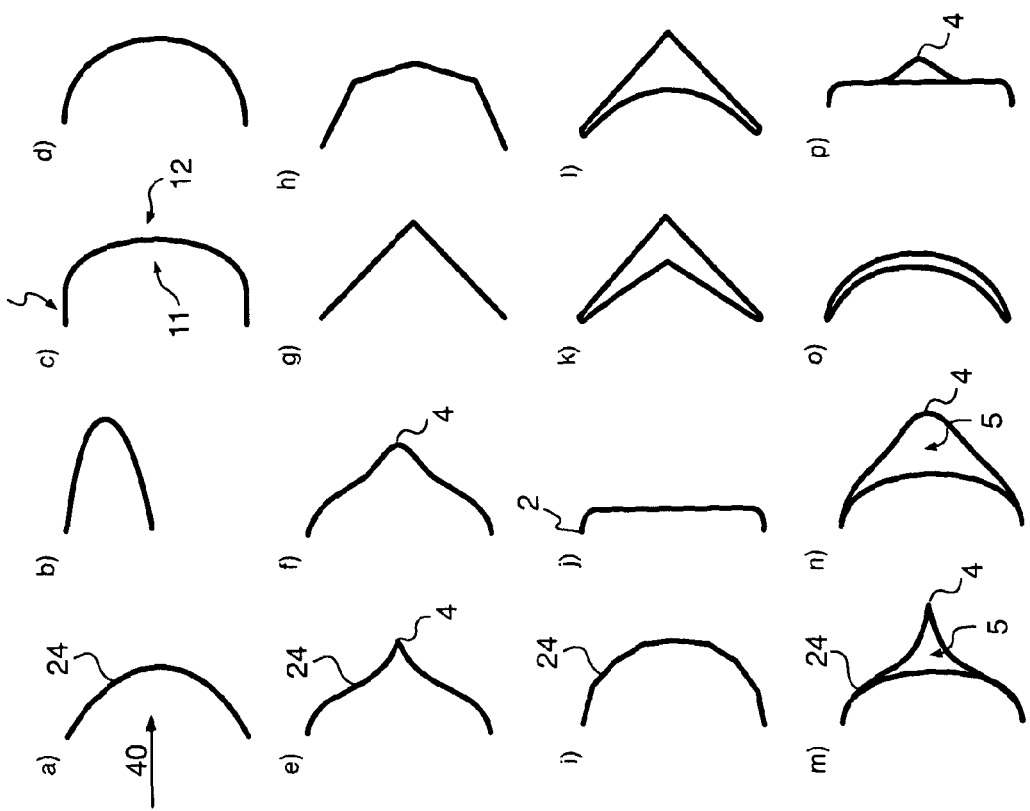
FIGS. 10a to 10p are schematic plan views illustrating a range of possible cross-sections for wave paddles embodying the present invention.

FIGS. 10a to 10p illustrate a range of different paddle 24 curvatures or cross-sections that may be used in embodiments of the present invention. FIGS. 10a to 10d show parabolic or semi-elliptical paddles similar to the first embodiment described above. The paddle illustrated in FIG. 10c includes backward facing straight extensions 27 to the tips 2 which extend in a direction generally parallel to the incident waves to limit egress of water around the edges of the paddle.

FIG. 10e shows a forward-pointing tip 4 design similar to the second embodiment described above but formed from a single-piece panel such that the backward face 11 has the same profile as the forward face 12. FIG. 10f shows an alternative to 10e with a blunted forward tip 4 for increased structural strength at the tip.

FIGS. 10g to 10i show paddles formed from two, four and eight flat sections, respectively, to approximate a smoothly curved surface. FIG. 10j shows a paddle with a substantially flat central portion curving at the ends to provide tips 2 pointing towards the incoming waves. This flat profile may be necessary for connection to some base devices.

FIGS. 10k to 10p show a range of compound paddle designs formed by using different cross-sections on the backward and forward faces of the paddle. Each compound paddle has an internal volume 5 that provides structural rigidity and buoyancy. FIG. 10k shows a paddle with the forward and backward faces each formed from two flat sections similar to FIG. 10g. FIG. 10l shows a paddle having a smoothly curved concave backward face similar to FIG. 10a and a forward face formed from two flat sections. FIG. 10m shows a paddle with a smoothly curved concave backward face and a forward-pointing tip 4 similar to FIG. 10e while the forward-pointing tip 4 on the paddle shown in FIG. 10n is blunted similar to the paddle shown in FIG. 10f. FIG. 10o shows a paddle with profiles of slightly different curvature on the backward and forward faces. FIG. 10p shows a paddle with a flat central portion to the backward face, similar to FIG. 10j, with a forward-pointing tip 4.

For each of the paddles shown in FIGS. 10a to 10p, the drag coefficient ($C_d$) of the backward face 11 is greater than 2. Depending upon the materials used, the drag coefficients ($C_d$) for the forward faces 12 lie between 0.3 and 2.0, the flatter design of FIG. 10j having the largest drag on the forward face 12 and the paddles with forward-pointing tips shown in FIGS. 10k-10n have amongst the lowest drag on the forward face 12. Symmetric, substantially flat paddles such as those known from the prior art have typical drag coefficient greater than 2 for both faces.

FIGS. 11a to 11f illustrate a range of paddle 24 and panel 23 combinations, similar to the embodiments described above in connection FIG. 8. In the arrangements shown in each of these Figures, the panels 23 may be fixed in place and simply serve to guide and concentrate wave energy onto a movable paddle 24, or each panel 23 may be independently movable as described above. FIG. 11a shows two smoothly curving panels 23 having a curvature that meets smoothly with an elliptically curved paddle 24 similar to the paddle illustrated in FIG. 10b. FIG. 11b shows a combination of four panels/paddles which have an overall shape similar to the paddle of FIG. 10g, but where any or all of the four panels/paddles may be independently movable to extract wave energy.

FIGS. 11c to 11e show panel 23 and paddle 24 combinations, where the panels and paddle are each made up of a number of flat sections. FIG. 11e, in particular, has a totally flat forward surface. Nevertheless, many of the advantages of the present invention are still realised due to the overall asymmetry in the horizontal plane perpendicular to the incident wave direction. The side panels 23 therefore focus wave energy smoothly onto the paddle 24.

FIG. 11f shows the combination of two wave concentrating panels 23 and a Gaussian-profiled paddle 24 similar to FIG. 8.

Figure 12:
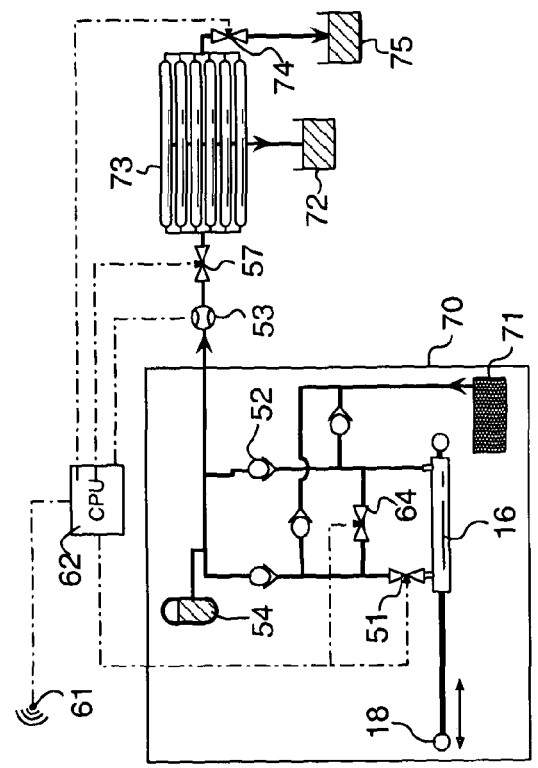
FIG. 12 is a diagrammatic view of a wave powered energy-generating system.

FIG. 12 shows a possible design of a wave powered hydraulic system designed to generate electricity. Other designs are well known in the art. The movement of the wave powered paddle compresses fluid in either end of a double acting hydraulic ram 16 and pumps it through one of two non-return valves 52 into a hydraulic accumulator 55. A hydraulic motor 58 pumps water to drive an alternator 59 to generate electricity. The volume of the accumulator 55 is preferably large relative to the volume of the ram 16, with a large plan area so the resulting pressure head available for the hydraulic motor 58 remains relatively constant. To reduce the height of the accumulator, while maintaining the pressure head, the void 56 in the head of the accumulator may be pressurized with gas.

The flow of fluid to the motor 58 is adjusted through control valve 57. Exhaust fluid passes to a reservoir 60 from which it is available to be sucked back into either end of the hydraulic ram 16 through a second set of non-return valves. In order to smooth any pressure fluctuations in the pipes from the wave paddle assembly to the accumulator, which may be of considerable length, a pressure chamber 54 is provided.

Where the base device has more than one ram 16, the overall resistance of the paddle movement can be altered by either engaging or disengaging additional rams. A convenient method to achieve this is to open a bypass valve 64 that permits fluid to flow from one side of the double acting hydraulic ram to the other. Preferably, an array of multiple paddles will share the same core system with only the elements within box 63 being repeated for each paddle. Some of the elements in box 63 may be located in an internal volume 5 of a paddle.

The system is controlled through a central computer unit 62. An electronic sensing system 61 monitors incoming waves and through the operation of a valve 51 the movement of the hydraulic ram 16, and therefore the paddle, can be tuned to suit wave conditions. The volume of fluid pumped is measured by a flow meter 53.

Figure 13A:
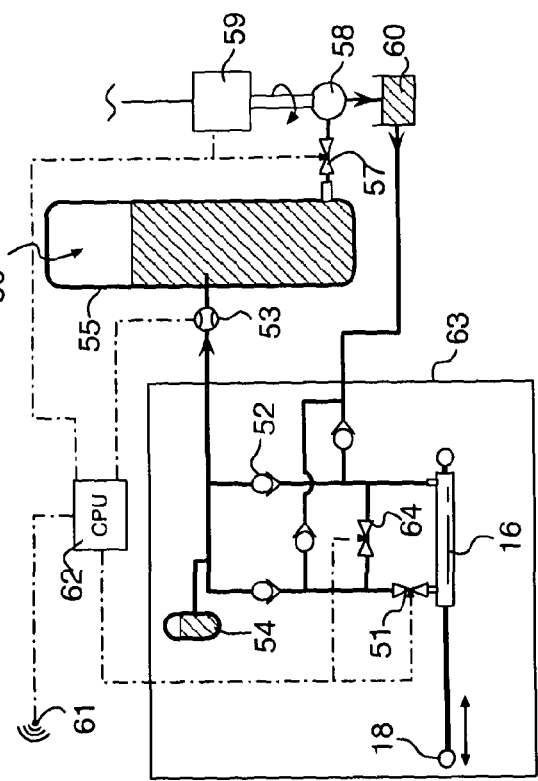
FIG. 13a is a diagrammatic view of a wave powered water desalination system.

FIG. 13a shows a possible design of a wave powered desalination system to convert sea-water to fresh-water. The elements in box 70 in this system are similar in operation to the elements in box 63 in FIG. 12, except that the working fluid is sea-water drawn in through filter 71. The sea-water is pressurised by the ram 16 and delivered via a flow meter 53 and control valve 57 to reverse osmosis equipment 73, which creates fresh water for collection in reservoir 72 and a concentrated brine solution for collection in reservoir 75. Control valves 74 and 57 are controlled through a central computer unit 62 to maintain the appropriate pressure across the reverse osmosis equipment 73.

Figure 13B:
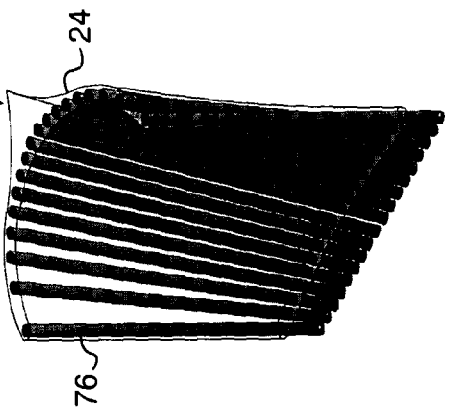
FIG. 13b is a 3D side elevation view of eighth wave paddle embodying the present invention with vertical structural tubes that also house osmotic membranes for a water desalination system.

Some of the elements of FIG. 13a may be located in an internal volume 5 of a paddle. For example, FIG. 13b illustrates a possible paddle design 24 in which reverse osmosis tubes are incorporated within vertical structural tubes 76 located between flat panels defining the forward 12 and backward 11 faces. The remainder of the equipment illustrated in FIG. 13a can be located in the front pointed tip 5 of the device, with a low pressure pipe delivering desalinated water ashore.

Figure 14A:
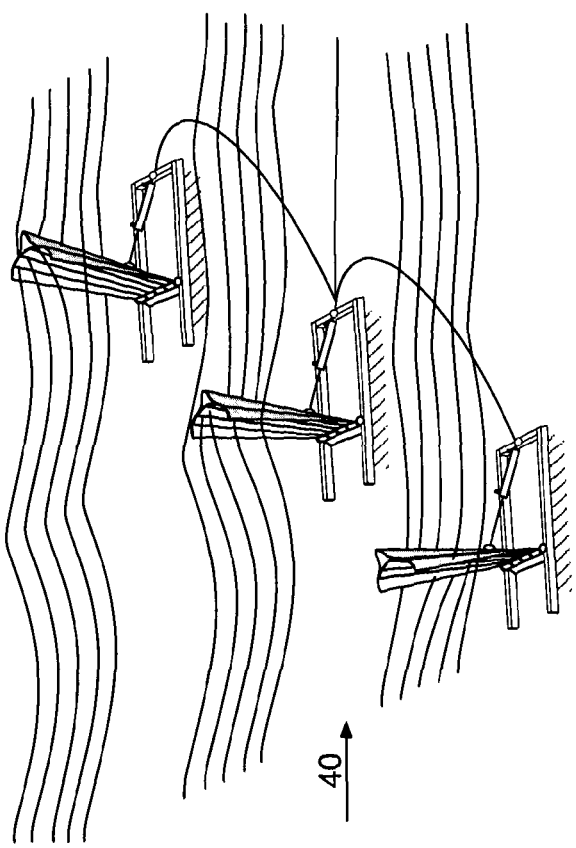
FIG. 14a is a 3D side elevation view of an array of paddles and base devices in situ.

FIG. 14a illustrates a group of three paddle units arranged to form a wave farm array. Each unit is positioned such that incoming waves strike them at different times in order to smooth the power extracted over the entire array. Preferably a large number of paddle units are used in parallel to smooth the delivery of water to the accumulator 55 or desalination equipment 73. The paddles may also be aligned so they collectively act as a breakwater reducing the size and intensity of the waves that approach the shore.

Figure 14B:
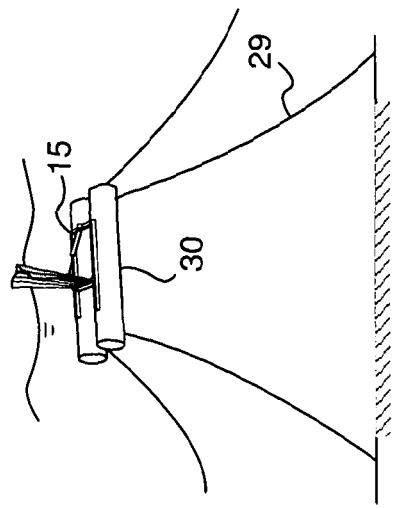
FIG. 14b is a 3D side elevation view of a paddle embodying the present invention mounted to a floating base device tethered to the ocean floor.

FIG. 14*b* illustrates one method of locating a paddle in deep water where it would be difficult or impossible to fix a base device 15 directly to the seabed. The paddle is attached to a base device 15 that is itself mounted on a submerged pontoon 30. The pontoon is anchored to the seabed using cables 29 which may be shortened or lengthened to position the paddle at the correct height depending upon wave conditions or to withdraw it from the surface of the water entirely in bad weather.

Figure 15:
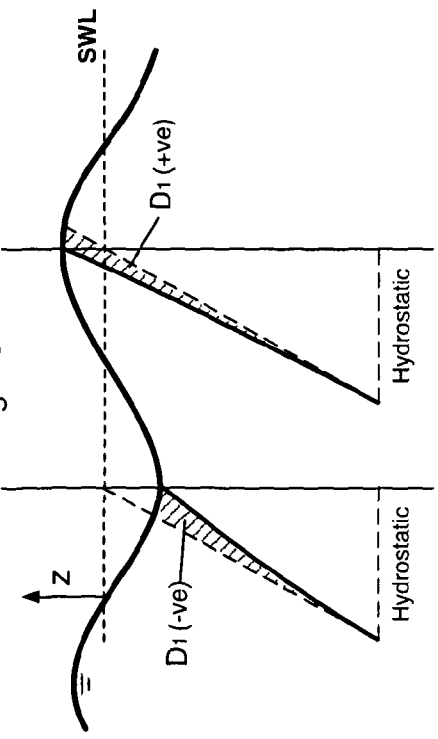
FIG. 15 illustrates how the dynamic pressures vary with depth beneath the crest and trough of a wave.
Figure 16:
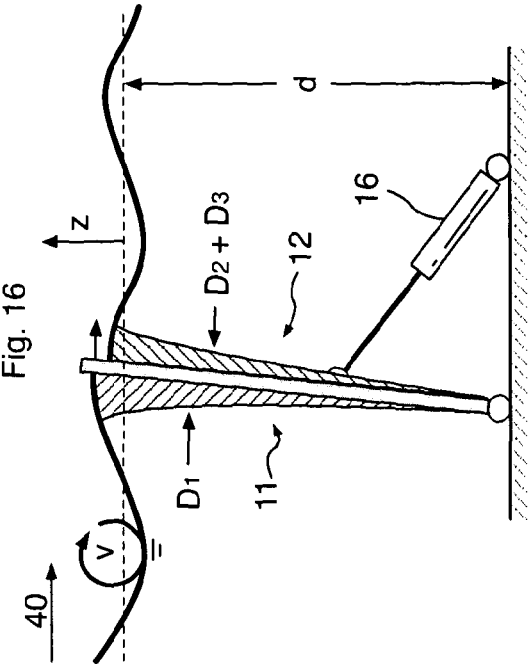
FIG. 16 illustrates how the dynamic pressure varies either side of a wave paddle beneath a wave crest.

FIGS. 15 to 17 illustrate pressure variations and flow velocities in the region of paddles embodying the present invention. These figures are provided to assist in understanding the mathematical and theoretical basis behind the present invention.

The pressure field associated with a wave is derived from the unsteady Bernoulli equation for an ideal fluid:

$$P = \rho \frac{\partial \varphi}{\partial t} - \frac{1}{2}\rho\left(\frac{\partial \varphi^2}{\partial x} + \frac{\partial \varphi^2}{\partial y} + \frac{\partial \varphi^2}{\partial z}\right) - \rho g z \quad \text{(Eq. 1)}$$

where $\phi$ is velocity potential, $\rho$ is density, g is gravitational acceleration and z is the vertical position above Still Water Level (SWL).

Figure 17A:
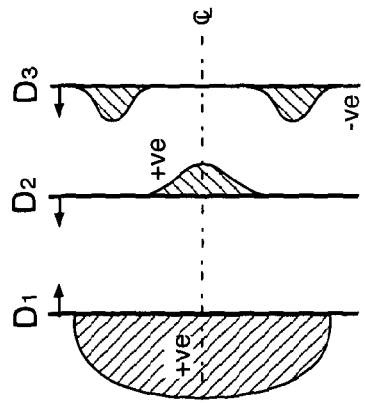
FIGS. 17a and 17b illustrate the relative flow velocities around a paddle, and the dynamic pressure on the forward- and backward-paddle faces.
Figure 17B:
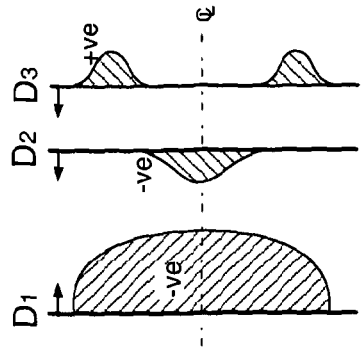

FIG. 15 illustrates the total pressures on a vertical paddle beneath a non-breaking wave, which are predominantly hydrostatic (i.e. $P=-\rho g z$), with an unsteady contribution near the surface from $$\rho \frac{\partial \varphi}{\partial t}$$

in Eq. 1. The presence of a wave at the surface only has a local impact on the pressures below, so that at a depth of approximately half the dominant wavelength the pressures become purely hydrostatic with respect to only the SWL. The difference between the actual pressure beneath the wave and the hydrostatic pressures relative to SWL, is known as the dynamic pressure ($D_1$), which alternates from a positive pressure under a wave crest to a negative pressure beneath a wave trough, as illustrated in FIGS. 17*a* and 17*b*.

FIG. 16 illustrates how the dynamic pressure might vary on the forward and backward sides of a wave paddle beneath a wave crest. As the paddle moves more slowly than the waves, the concave curvature of the backward face 11, constrains the fluid motion and amplifies the pressures $D_1$ along this face: both positively within a crest and negatively within a trough.

On the forward face 12 the dynamic pressure is derived from a combination of processes, which include:

1) An inertia force due to the relative acceleration of the paddle against the water, which causes a change in the inertia of the surrounding fluid. Therefore this pressure will typically be largest at either extent of the paddle motion when the paddle 24 has the greatest acceleration. As the motion of the water on the backward face 11 drives the paddle, the region of water affected by this paddle acceleration can be idealised as a body of water 41 in front of the paddle. This is typically Gaussian in shape and resists changes in the paddle velocity. In the literature this is usually accounted for by adding mass to the paddle, and is therefore referred to as "added-mass".

2) Once the paddle is moving there is a corresponding drag force, which is largely responsible for creating a wave that propagates at a perpendicular angle from the paddle's forward surface 12 and dissipates energy. Energy within dissipated waves is proportional to the square of the wave velocity, so it is beneficial to minimise these velocities. The convex forward face 12 and the pointed tip 4, both help to reduce these perpendicular wave velocities.

3) A constructive pressure ($D_3$) due to incident lee side waves 42 that pass around the tips 2 of the paddle on the outer side, and travel around the forward surface 12 of the paddle. During a passing crest (FIG. 17*a*), the lee side wave 42 mobilises the fluid in front of the paddle, creating a negative dynamic pressure ($D_3$) along the front face 12 of the paddle. During a passing trough (FIG. 17*b*), the lee side wave 42 now travels in the opposite direction, creating additional positive dynamic pressure along the front face 12.

This third process works to draw the paddle in the direction of travel of the wave, thus increasing the energy available to the paddle. During initial testing of embodiments of the present invention, this was an unexpected effect of the smooth curvature on the forward face 12 of the paddle that was anticipated to only reduce the drag force mentioned in process 2 above. The energy captured by the device was therefore significantly greater than anticipated. In effect, the device captures energy over a wave front that is wider than the actual paddle width.

Balancing the main forces that act on the paddle:

$$\Sigma\left[(D_1 - D_2 - D_3) = (m + m_{added})\cdot a + F_p\right] \quad \text{(Eq. 2)}$$

where $F_p$ represents the force between the paddle and the piston that extracts power, m is the mass of the paddle, and $m_{added}$ is the added mass.

During the paddle's forward movement $D_1$ and $D_3$ act together, and are constrained by $D_2$ (see FIG. 17*a*), while the component on the right hand side of Eq. 2 represents stored, extracted and lost energy, respectively. During the paddle's backward movement $D_1$ is now predominantly negative due to the trough that forms on the paddles backward face 11, $D_3$ turns positive, and $D_2$ become negative.

The power extracted from the paddle can be approximated by:

$$\text{Power} \propto \frac{F_P \cdot \Delta}{T} \quad \text{(Eq. 3)}$$

where T is the dominant wave period, $\Delta$ is the horizontal travel of the paddle and $F_P$ is the mean force between the paddle and piston. As T is fixed by the given wave conditions the only way to change the power extracted from the waves is through a change to the product $F_P \cdot \Delta$.

There are two limiting conditions for this equation when no power is extracted:

1) If the paddle is locked so it acts as a rigid vertical wall then $\Delta=0$ and $F_P$ will be maximized. However, with no movement and assuming other losses are small, then almost all of the energy is reflected so it travels back against the incoming waves.

2) If the paddle moves freely with the waves, so $F_P=0$, then $\Delta$ is maximized. If the paddle is sufficiently light to allow it to move at the same velocity as the fluid on the incoming wave side, then almost all of the wave energy that reaches the paddle is absorbed and immediately dissipated on the opposite side through the creation of new secondary waves.

Laboratory test have been conducted for a range of curved test paddle designs and a flat symmetric test paddle that forms a base for comparison. The laboratory facility is 15 m long, 2.5 m wide, with 1 m of water depth. The tank contained computer control wave generators at one side and a beach to absorb the waves at the other. Each test paddle had width and height of exactly 1 m, such that the projected area towards the incident waves was the same. All the paddles were mounted in a generally vertical orientation above a fixed frame, 20 cm above the tank floor, which allowed the paddles to rotate forward and backward inline with the incident wave direction. This rotation was constrained by a pneumatic piston connected through a force transducer to the top of the test paddle, with valves on the piston configured to provide suitable resistance, while also pumping air with each stroke (similar to the configuration shown in box 63 of FIG. 12).

FIGS. 18a and 18b presents some sample results for a curved (Test #123) and flat (Test #139) paddle, respectively, for near identical incident waves. The curved paddle was of form similar to that shown in FIG. 2a, with a depth of concavity of approximately 0.3 m. The incident wave height for each case was approximately 16 cm with a period of 1.3 s, which equated to incident wave energy of about 31 W/m.

Comparing the Force and Displacement curves for each paddle, it is evident that the curved paddle delivered a much greater force and consequently a large displacement. From these two curves Eq. 3 is used to compute the power generated and mean power output over 2 s window (shown with a dashed line). These results demonstrate the curve paddle delivers a mean power output of about 51 W/m, while the flat paddle delivered only about 23 W/m. A further unexpected result is that the curved paddle delivers approximately equal power during both a passing wave crest and wave trough, whereas a flat paddle deliver ~30% less power from a trough.

A range of other wave frequencies and heights were also tested, with the curved design consistently delivering between 40% and 150% more power. With optimisation of the curved paddle design based on wave conditions, even greater relative improvements can be expected.

The invention claimed is:

1. A wave energy extraction device to extract energy from water waves through forwards and backwards motion of the device for use with a wave energy conversion apparatus to convert that energy to a useful form, the device having a height and a width and being arrangeable on the wave energy conversion apparatus so as to be at least partially submerged in the water and comprising:
   a first surface arranged to oppose a mean water wave direction, the first surface being concave about a vertical axis of symmetry of the device; and
a second surface disposed opposite the first surface and being convex about the vertical axis of symmetry of the device;
   wherein the device extracts power
   from the crest of a wave by virtue of a positive dynamic water pressure on the first surface and a negative dynamic water pressure on the second surface; and
   from the trough of a wave by virtue of a negative dynamic water pressure on the first surface and a positive dynamic pressure on the second surface.

2. The wave energy extraction device of claim 1, wherein a cross-sectional profile of the second surface additionally extends to a tip at the vertical axis of symmetry of the device.

3. The wave energy extraction device of claim 1, wherein a cross-sectional profile of the second surface is formed with a Gaussian profile.

4. The wave energy extraction device of claim 1, wherein the cross-sectional profile of the second surface has a low resistance to motion through the water.

5. The wave energy extraction device of claim 1, wherein horizontal extremities of the first concave surface are formed as tips arranged to oppose the mean wave direction during use.

6. The wave energy extraction device of claim 1, comprising:
   a wave energy absorber component having a first width and adapted to move in response to incoming water waves for extracting power; and
   a wave energy concentrator component for concentrating water waves from across a second width greater than the first width down to the first width and guiding the concentrated wave energy towards the wave energy absorber component.

7. The wave energy extraction device of claim 1, further comprising an attachment point for attachment to the wave energy conversion apparatus, and wherein the device has a cross-sectional profile that tapers toward a flat profile adjacent to the attachment point.

8. The wave energy extraction device of claim 1, wherein the concave first surface is adapted to focus wave energy toward a central portion of the wave energy extraction device.

9. The wave energy extraction device of claim 1, wherein the first surface and the second surface are separate components fixed together to create an internal volume and wherein the internal volume is sealed against the ingress of water to provide buoyancy to the device.

10. The wave energy extraction device of claim 1, wherein each of the first concave surface and the second convex surface are parabolic or semi-elliptic in form.

11. The wave energy extraction device of claim 1, wherein the concavity of the first surface has a depth that is between $\frac{1}{16}$ and $\frac{1}{4}$ of the length of an expected dominant wavelength of the water waves.

12. A method of extracting useful energy from water waves comprising:
   at least partially submerging a wave energy extraction device in a body of water;
   angling a first surface of the device to oppose an approximate mean water wave direction, the first surface being concave about a vertical axis; and
   using a wave energy conversion apparatus, extracting energy from forwards and backwards movement of the device caused by both the crest and the trough of incoming waves the device extracting energy:
   from the crest of a wave by virtue of a positive dynamic water pressure on the first surface and a negative dynamic water pressure on the second surface; and
   from the trough of a wave by virtue of a negative dynamic water pressure on the first surface and a positive dynamic pressure on the second surface.

13. The method of claim 12, further comprising:
   providing the wave energy extraction device with a second surface angled to be on the lee side of the apparatus pointing in the approximate mean water wave direction and shaped to minimize drag due to water resistance.

14. The method of claim 12, further comprising channelling incoming waves from each side of the wave energy extraction device towards the device, thereby focusing the energy of the waves onto a first surface of the device.

\* \* \* \* \*